Oct. 26, 1937.  O. SANDERS, JR  2,097,309
SPRING SUSPENSION FOR VEHICLES
Filed Jan. 24, 1936
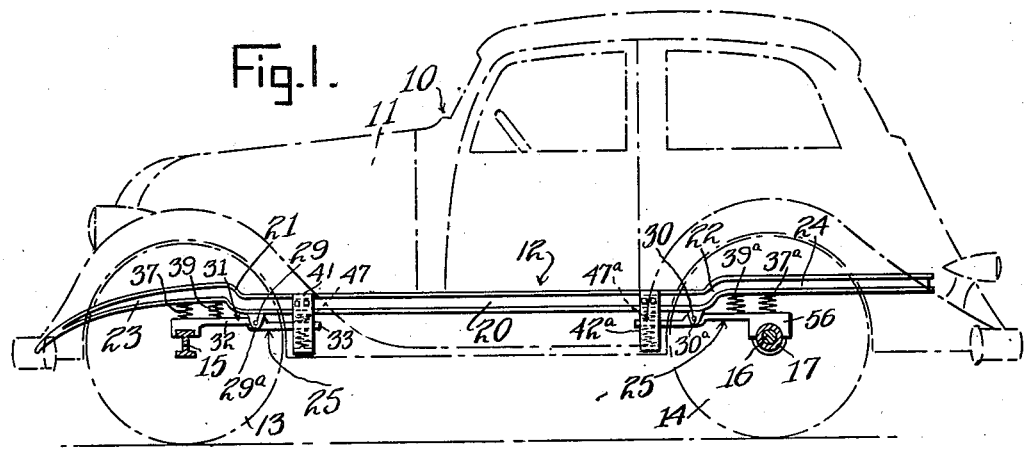
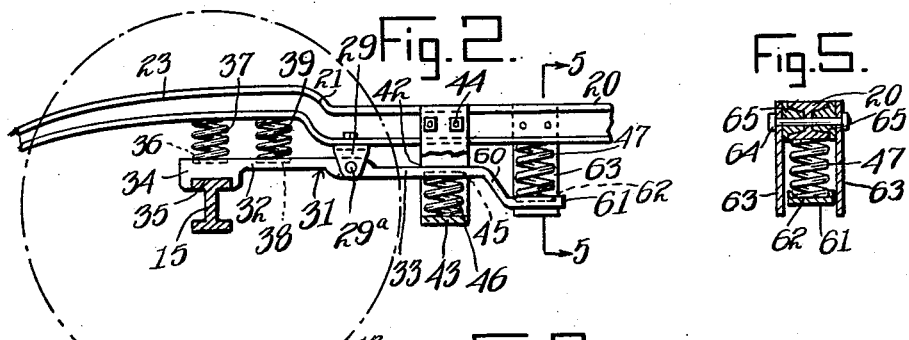
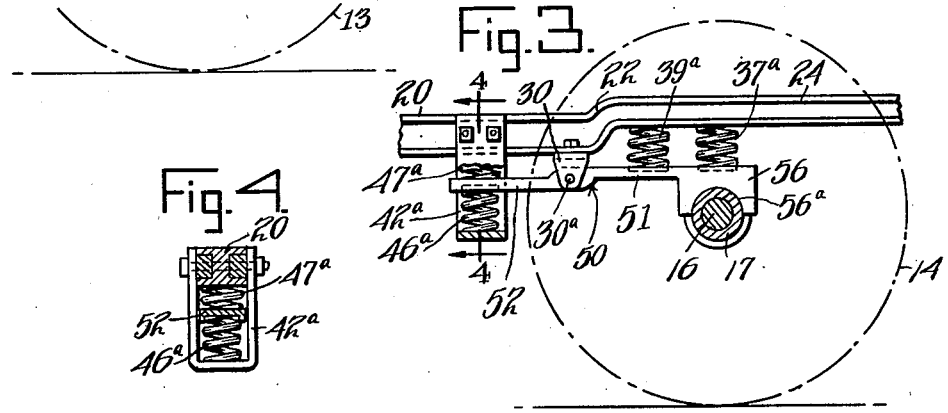
Inventor
Oscar Sanders, Jr.
By Carl Miller
Attorney

UNITED STATES PATENT OFFICE 2,097,309

SPRING SUSPENSION FOR VEHICLES

Oscar Sanders, Jr., Bronx, N. Y.

Application January 24, 1936, Serial No. 60,623

12 Claims. (Cl. 280—106.5)

This invention relates to vehicles. It is particularly directed to a spring suspension for vehicles, such as automobiles.

An object of this invention is to provide a highly efficient, economical spring suspension for automobiles and the like vehicles, which shall be rugged and durable and easily assembled, and adapted for use in low and streamlined automobiles.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of an automobile provided with the spring suspension embodying the invention, with the body and wheels shown in dot dash lines;

Fig. 2 is an enlarged, side elevational view of the front end of the automobile with parts in cross-section, illustrating a modified construction;

Fig. 3 is an enlarged, side elevational view of the rear portion of the automobile with parts in cross-section;

Fig. 4 is a cross-sectional view taken on line 4—4 of Fig. 3; and

Fig. 5 is a cross-sectional view taken on line 5—5 of Fig. 2.

Referring now in detail to the drawing, 10 designates an automobile comprising a body 11 having a chassis frame 12, front wheels 13 and rear wheels 14. The front wheels 13 are supported by an I-beam axle 15. The rear wheels 14 are supported by an axle 16 having an axle housing 17 thereon. The frame 12 may also be of I-beam construction. Each longitudinal side of the frame 12 has a central portion 20 disposed between the axles 15 and 17. At the ends of the portion 20 are upwardly bent portions 21 and 22 from which there extends forwardly, a front portion 23 and rearwardly, a rear portion 24 disposed parallel to but above the level of the central portion 20. As shown in the drawing, the portions 23 and 24 overlie the axles 15 and 16.

My improved suspension 25 for each of the front and rear wheels is the same for the right and left sides of the vehicle, and therefore the suspension on one side only will be described.

The suspension means 25 comprises a pair of U-shaped members 29 and 30 fixed to the under side of the portion 20 of the frame, preferably adjacent the ends of said portion. The members 29 and 30, as shown in the drawing, are located inwardly of or between the axles 15 and 16. Said members 29 and 30 are preferably of inverted U-shape, being bolted to the frame and having parallel ears provided with cross-pin 29a and 30a. Pivoted to the cross-pin 29a is a lever 31 having a forwardly extending arm 32 and a rearwardly extending arm 33. The arm 32 has a thickened portion 34 at the front end provided with a transverse groove 35 at the under side thereof receiving the top of the axle 15. The upper side of the thickened portion 34 is formed with a shallow, cylindrical socket 36 receiving the lower end of a coil compression spring 37 interposed between said thickened portion and the under side of the frame portion 23. The lever arm 32 is also formed between the pivot point thereof and the outer end thereof with a shallow, cylindrical socket 38, receiving the lower end of a spring 39 interposed between said arm and said frame portion 23.

Fixed to the frame portion 20 rearwardly of the member 29 is a U-shaped bracket 41 having vertical side walls 42 interconnected by a bottom wall 43. The upper ends of the vertical walls 42 receive the frame portion 20 therebetween. Blocks may be interposed between said walls 42 and the web of the frame portion 20. Bolts 44 passing through said vertical walls 42, the blocks and the web of the frame, serve to fix the bracket to said frame.

It will be noted that the rear end of the lever arm 33 extends between the side walls 42 of the bracket 41. The under side of the said arm is formed with a shallow, cylindrical socket 45 receiving the upper end of a coil compression spring 46 interposed between said arm and the bottom wall 43 of the bracket. A spring 47 may be interposed between arm 33 and the frame portion 20.

The suspension 25 for the rear wheels may be substantially the same as that of the front wheels. To this end, there is pivoted to the member 30 on each side of the automobile, a lever 50 having a rearwardly extending arm 51 and a forwardly extending arm 52. Fixed to the frame portion 20, forwardly of the member 30, is a bracket 42a, similar to the bracket 42 and receiving the front end of the arm 52, there being a coil compression spring 46a interposed between said arm and the bottom of the bracket. The rear arm 51 likewise has a thickened portion 56 at the rear end thereof formed with a semi-cylindrical groove 56a on the under surface thereof, receiving the axle housing 17. Coil compression springs 37a and 39a, similar to the springs 37 and 39 and symmetrically located, are interposed between the lever arm 51 and the frame portion 24. A spring 47a may be interposed between arms 52 and frame portion 20.

It will be noted that the arms 32 and 51 of the levers 31 and 50 are at a higher level than the inwardly extending arms 33 and 52 of said levers.

The operation of the suspension means will now be described. Normally, the weight of the vehicle tends to rotate the lever 31 in a clockwise direction about the pivot thereof. Such movement is however retarded or taken up by the coil compression springs 37, 39 and 46. The rear levers 50 tend to rotate in a counter clockwise direction, the weight of the vehicle thus being taken up by the coil compression springs 37a, 39a and 46a. If the vehicle, while being operated, strikes an obstruction, and the body of the automobile moves downwardly, shock will be absorbed by the springs 37, 39 and 46 and 37a, 39a and 46a, as described above. The vehicle body, after moving downwardly, will rebound upwardly and move above the normal position thereof, causing the levers 31 to rotate about the pins 29a in a counter-clockwise direction and the levers 50 about the pins 30a in a clockwise direction. Such movement of the levers will compress the springs 47 and 47a for absorbing the shock of the rebound. Since the frame portion 20 is lower than the frame portions 23 and 24, the automobile body may be built comparatively low, the space between the axles and the frame being less than in the usual leaf spring suspensioned vehicles. It will be understood that the springs 37 and 37a may, if desired, be omitted.

In Figs. 2 and 5, there is illustrated a somewhat modified construction which may be applied to the front as well as the rear wheels of the vehicle. The arm 33 of the lever 31, as shown in Fig. 2, may have a downwardly bent portion 60 from which there extends a horizontal portion 61. Instead of placing the spring 47 on the arm 33, above the spring 46, as shown in Fig. 1, said spring may be placed on the portion 61 of the lever, and hence interposed between said portion and the frame portion 20. With such construction, additional space is provided for the spring 47, whereby a longer spring may be used and the rebound or upward movement of the vehicle body will be more gradually retarded. For confining the spring 47 on said lever, the portion 60 may be formed with a shallow, cylindrical recess 62 for receiving the bottom end of the spring 47. Furthermore, a bracket comprising confining plates 63 may be attached to the frame 20 by means of bolts 64 passing through the web of the frame portion 20 and through blocks 65 interposed between said plates and web.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth, or shown in the accompanying drawing, is to be interpreted as illustrative and not in a limiting sense.

Having thus described my invention, I claim as new and desire to secure by Letters Patent:

1. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a U-shaped bracket fixed to the depressed portion of the frame and extending downwardly therefrom and receiving the second arm between the side walls thereof, a spring interposed between said second arm and the bottom wall of said bracket, and a spring interposed between said first arm and the raised portion of said frame and disposed directly above said axle.

2. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a U-shaped bracket fixed to the depressed portion of the frame and extending downwardly therefrom and receiving the second arm between the side walls thereof, a spring interposed between said second arm and the bottom wall of said bracket, a spring interposed between said first arm and the raised portion of said frame and disposed directly above said axle, and a second spring interposed between said first arm and the raised portion of said frame and disposed between said axle and the pivot point of said lever.

3. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a U-shaped bracket fixed to the depressed portion of the frame and extending downwardly therefrom and receiving the second arm between the side walls thereof, a spring interposed between said second arm and the bottom wall of said bracket, a spring interposed between said first arm and the raised portion of said frame and disposed directly above said axle, and a second spring interposed between said first arm and the raised portion of said frame and disposed between said axle and the pivot point of said lever, said lever having shallow, cylindrical sockets for receiving adjacent ends of the said springs.

4. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a U-shaped bracket fixed to the depressed portion of the frame and extending downwardly therefrom and receiving the second arm between the side walls thereof, a spring interposed between said second arm and the bottom wall of said bracket, a spring interposed between said first arm and the raised portion of said frame and disposed directly above said axle, and a second spring interposed between said first arm and the raised portion of said frame and disposed between said axle and the pivot point of said lever, said lever having shallow, cylindrical sockets for receiving adjacent ends of the said springs, the first arm of said lever being disposed at a higher level than the second arm of said lever.

5. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a U-shaped bracket fixed to the depressed portion of the frame and extending downwardly therefrom and receiving the second arm between the side walls thereof, a spring interposed between said second arm and the bottom wall of said bracket, a spring interposed between said first arm and the raised portion of said frame and disposed directly above said axle, a second spring interposed between said first arm and the raised portion of said frame and disposed between said axle and the pivot point of said lever, and another spring interposed between said second arm and said depressed portion of said frame.

6. In a vehicle having an axle, and a frame having a raised portion disposed directly above the axle, and a depressed portion disposed between the axles of the vehicle, a lever pivoted to the depressed portion of the frame and having an arm engaging the axle and disposed below the raised portion of the frame, said lever having a second arm disposed below the depressed portion of the frame, said second arm having a depressed outer end portion, a U-shaped bracket fixed to the depressed portion of the frame, and extending downwardly therefrom and receiving the second arm between the side walls thereof, a spring interposed between the first arm of said lever and the raised portion of said frame, a second spring interposed between said second arm and the bottom wall of said bracket, and a spring interposed between the depressed end portion of said second arm of said lever and said depressed portion of said frame.

7. In a vehicle having an axle, and a frame having a raised portion disposed directly above the axle, and a depressed portion disposed between the axles of the vehicle, a lever pivoted to the depressed portion of the frame and having an arm engaging the axle and disposed below the raised portion of the frame, said lever having a second arm disposed below the depressed portion of the frame, said second arm having a depressed outer end portion, a U-shaped bracket fixed to the depressed portion of the frame, and extending downwardly therefrom and receiving the second arm between the side walls thereof, a spring interposed between the first arm of said lever and the raised portion of said frame, a second spring interposed between said second arm and the bottom wall of said bracket, a spring interposed between the depressed end portion of said second arm of said lever and said depressed portion of said frame, and a bracket attached to said depressed portion of said frame having confining plates disposed on opposite sides of said depressed end portion of said second arm of said lever.

8. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a bracket fixed to the depressed portion of the frame and extending downwardly therefrom, a spring interposed between said second arm and bracket, a spring interposed between said first arm and the raised portion of said frame and disposed directly above said axle, and a second spring interposed between said first arm and the raised portion of said frame and disposed between said axle and the pivot point of said lever, the first arm of said lever being disposed at a higher level than the second arm of said lever.

9. In a vehicle having an axle and a frame having a raised portion disposed directly above the axle and a depressed portion disposed between the axles of the vehicle, a lever pivoted to the depressed portion of the frame and having an arm engaging said axle and disposed below the raised portion of the frame, said lever having a second arm disposed below the depressed portion of said frame, a bracket fixed to the depressed portion of the frame and extending downwardly therefrom, a spring interposed between said second arm and said bracket, a spring interposed between said first arm and the raised portion of said frame and disposed directly above said axle, a second spring interposed between said first arm and the raised portion of said frame and disposed between said axle and the pivot point of said lever, and another spring interposed between said second arm and said depressed portion of said frame.

10. In a vehicle having an axle, and a frame having a raised portion disposed directly above the axle, and a depressed portion disposed between the axles of the vehicle, a lever pivoted to the depressed portion of the frame and having an arm engaging the axle and disposed below the raised portion of the frame, said lever having a second arm disposed below the depressed portion of the frame, said second arm having a depressed outer end portion, a bracket fixed to the depressed portion of the frame, and extending downwardly therefrom, a spring interposed between the first arm of said lever and the raised portion of said frame, a second spring interposed between said second arm and said bracket, and a spring interposed between the depressed end portion of said second arm of said lever and said depressed portion of said frame.

11. In a vehicle having an axle, and a frame having a raised portion disposed directly above the axle, and a depressed portion disposed between the axles of the vehicle, a lever pivoted to the depressed portion of the frame and having an arm engaging the axle and disposed below the raised portion of the frame, said lever having a second arm disposed below the depressed portion of the frame, said second arm having a depressed outer end portion, a bracket fixed to the depressed portion of the frame, and extending downwardly therefrom, a spring interposed between the first arm of said lever and the raised portion of said frame, a second spring interposed between said second arm and said bracket, a spring interposed between the depressed end portion of said second arm of said lever and said depressed portion of said frame, and plates disposed on opposite sides of said depressed end portion of said second arm of said lever.

12. In a vehicle having an axle and a frame, a lever pivoted to the frame and having an arm engaging the axle, said lever having a second arm having a depressed outer end portion, a bracket fixed to the frame and extending downwardly therefrom, a spring interposed between the first arm of the lever and said frame, a second spring interposed between said second arm and said bracket, and a spring interposed between the depressed end portion of said second arm of said lever and said frame.

OSCAR SANDERS, Jr.